(12) United States Patent
Daoud

(10) Patent No.: US 6,349,893 B1
(45) Date of Patent: Feb. 26, 2002

(54) RETRACTABLE FIBER SLACK STORAGE DEVICE

(75) Inventor: Bassel Hage Daoud, Parsippany, NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/495,996

(22) Filed: Feb. 1, 2000

(51) Int. Cl.[7] .......................... B65H 75/04; B65H 75/40
(52) U.S. Cl. .................... 242/376; 242/377; 242/378.3; 242/407; 242/613.2
(58) Field of Search ................................ 242/376, 377, 242/378.1, 378.2, 378.3, 407, 613.2, 613.3, 388.1, 388.2, 388.3, 388.4, 388.5

(56) References Cited

U.S. PATENT DOCUMENTS

| | | | | |
|---|---|---|---|---|
| 2,206,352 A | * | 7/1940 | Hellmann ................... 272/376 |
| 2,742,242 A | * | 4/1956 | Godwin ................... 242/378.1 |
| 2,865,071 A | * | 12/1958 | Clemens ................... 242/388.1 |
| 3,295,673 A | * | 1/1967 | Bowe ....................... 242/613.2 |
| 3,306,552 A | * | 2/1967 | Nakolan ................... 242/378.3 |
| 3,425,646 A | * | 2/1969 | Hollowell ................. 242/378.3 |
| 3,601,331 A | * | 8/1971 | Frey et al. ............... 242/378.3 |
| 4,083,510 A | * | 4/1978 | Gomez ....................... 242/377 |
| 4,466,581 A | * | 8/1984 | Hill ........................... 242/407 |
| 4,901,938 A | * | 2/1990 | Cantley et al. .......... 242/378.1 |
| 5,735,482 A | * | 4/1998 | Kuzik ....................... 242/613.3 |
| 5,779,175 A | * | 7/1998 | Shirahase ................ 242/388.1 |

* cited by examiner

*Primary Examiner*—John M. Jillions
(74) *Attorney, Agent, or Firm*—Howard C. Miskin; Gloria Tsui-Yip

(57) ABSTRACT

The fiber slack storage device of the present invention for storing a slack length of a fiber optic strand comprises a spool comprising a pair of diametrically-opposed cylindrical barrels, and a cylindrical housing for at least partially enclosing the spool. The spool is disposed in the housing and is rotatable with respect thereto and the minimum radius of curvature of each of the cylindrical barrels is equal to or greater than the minimum bend radius of the fiber optic strand.

18 Claims, 11 Drawing Sheets

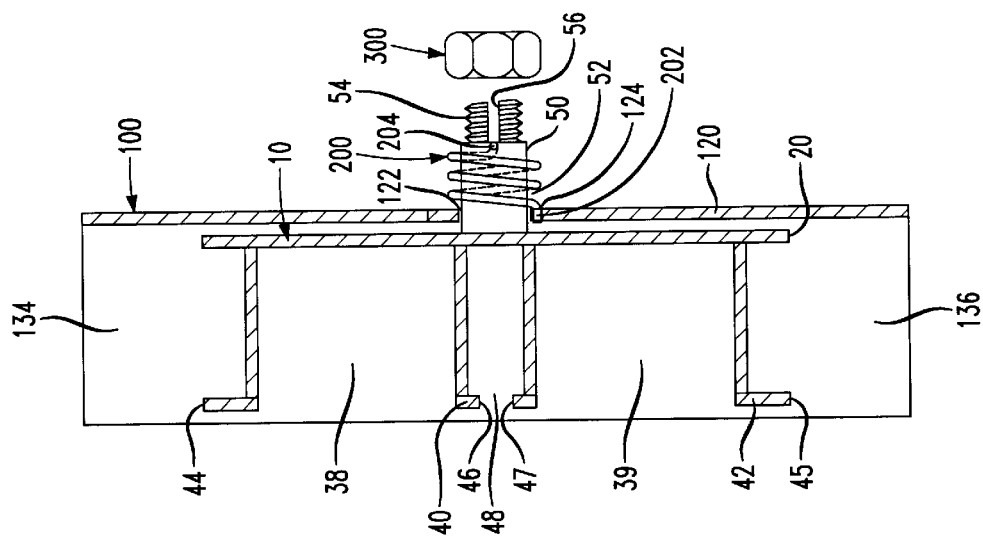
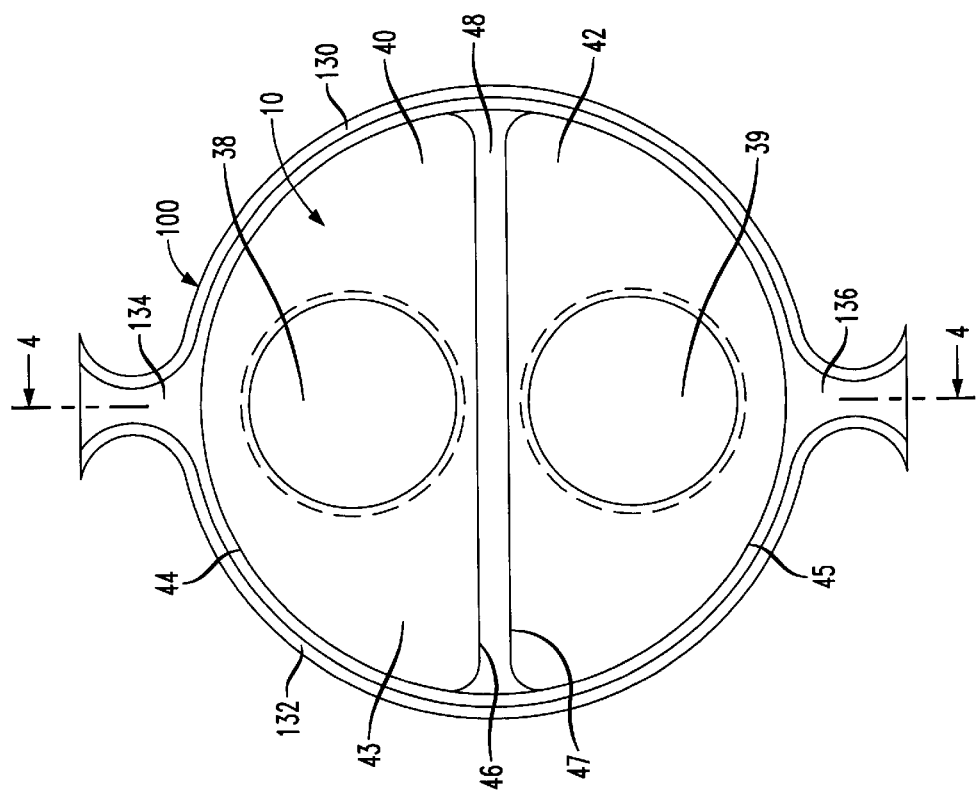

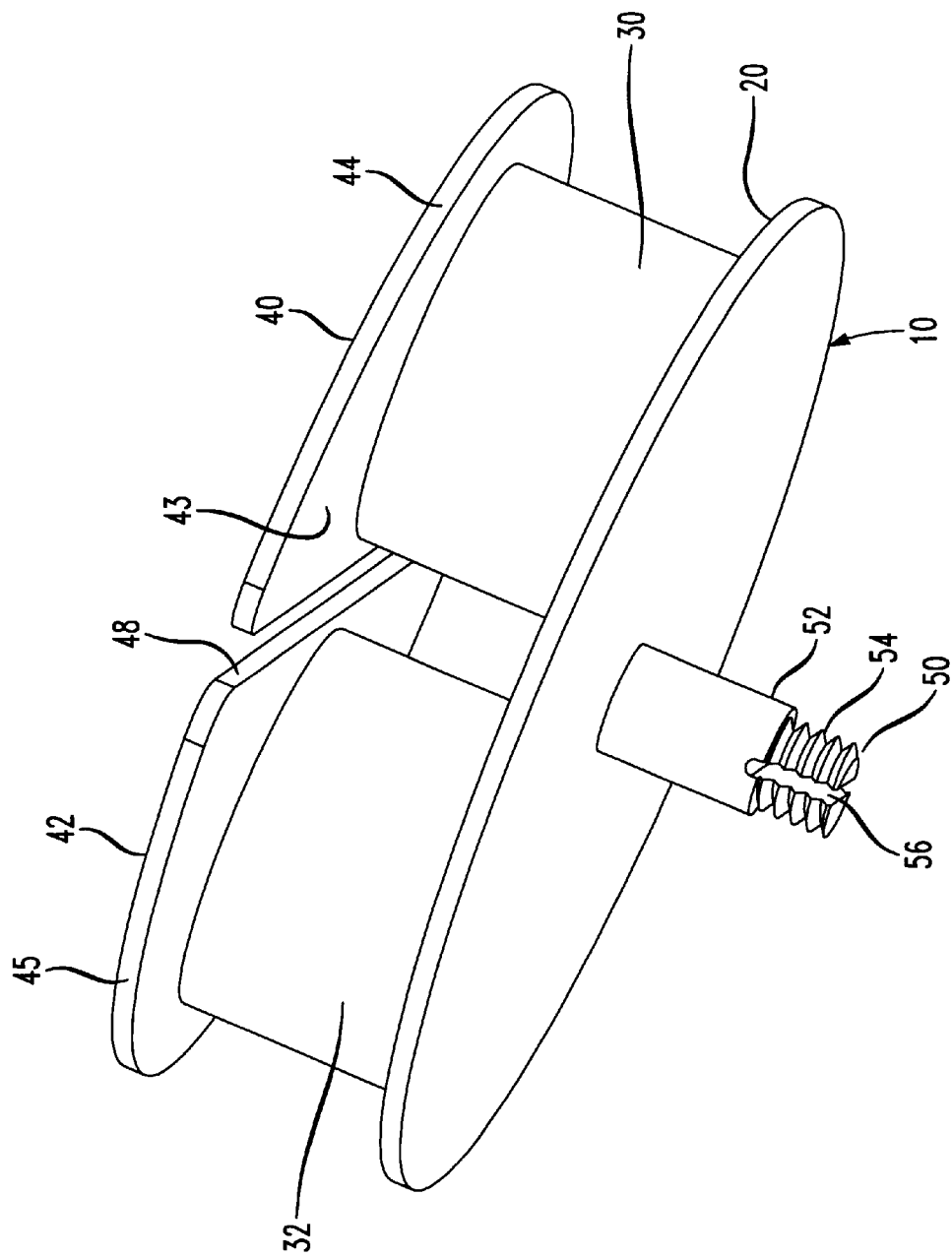

RETRACTABLE FIBER SLACK STORAGE DEVICE

FIELD OF THE INVENTION

The present invention relates to a device for retractably storing slack lengths of fiber optic strands so that those strands are available for use but are protected from tangling and harm when not in use.

BACKGROUND OF THE INVENTION

Fiber optic strands and cables of fiber optic strands are used for conveying information, much as telephone wire and cable are used.

These strands are operatively terminated in a frame for conveying information. These connections are changed from time to time and the new point of termination may be at a different location on the frame or may be on a frame that is located at a distance from the preceding frame location. Hence, it is desirable when installing fiber optic strands and cables to provide a length of slack strand or cable. This slack has previously been hung from equipment racks and festooned down from the rack to the floor or in adjacency with the floor. To provide for future needs as to length for termination in a new location multiple loops or festoons of slack might be provided. The amount of slack length was limited by the rack-to-floor height available. In addition, these festoons of slack lengths could get tangled among themselves and other equipment, such that they are hard to manipulate or identify or may get damaged.

Therefore, there is a need for a device for conveniently and safely storing a slack length of fiber optic strand.

SUMMARY OF THE INVENTION

The retractable fiber slack storage device of the present invention makes lengths of fiber optic strands available for use when needed but protects them from tangling or being damaged when not in use. Further, this storage device allows ease of identification, making the area neat.

The retractable fiber slack storage device of the present invention permits a slack length of fiber to be quickly dispensed when needed.

The retractable fiber slack storage device of the present invention for storing a slack length of a fiber optic strand comprises a spool comprising a pair of diametrically-opposed cylindrical barrels and a cylindrical housing for at least partially enclosing the spool. The spool is disposed in the housing and is rotatable with respect thereto and the minimum radius of curvature of each of the cylindrical barrels is equal to or greater than the minimum bend radius of the fiber optic strand being stored therein.

BRIEF DESCRIPTION OF THE DRAWINGS

FIG. 3 is a top plan view of the storage device of the present invention;

FIG. 4 is a side elevation view, taken in section along line 4—4 of FIG. 3, of the storage device of the present invention;

FIG. 6 is a bottom perspective view of the spool component of the storage device of the present invention;

DETAILED DESCRIPTION OF THE PREFERRED EMBODIMENTS

Figure 1:
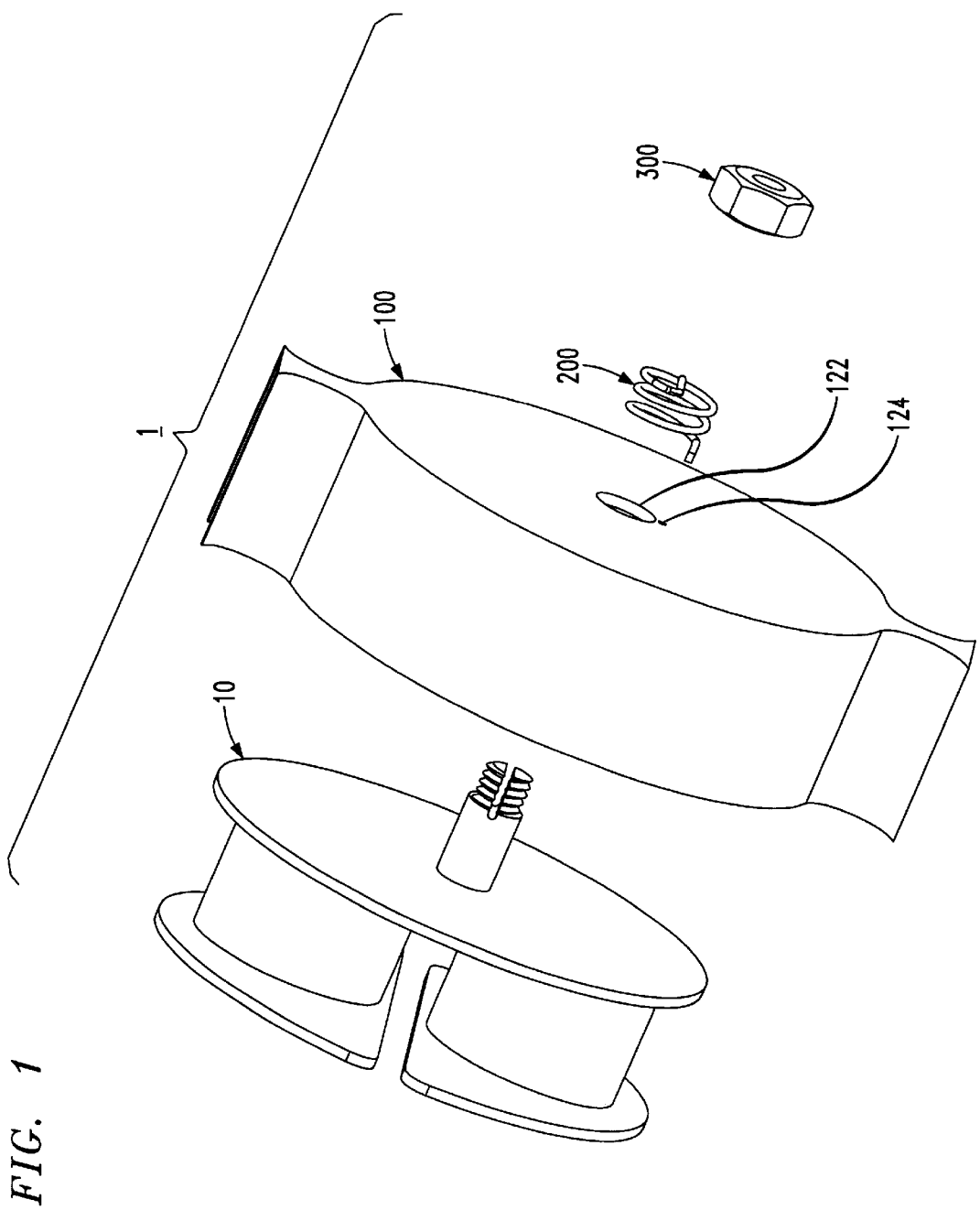
FIG. 1 is an exploded bottom perspective view of the storage device of the present invention.
Figure 2:
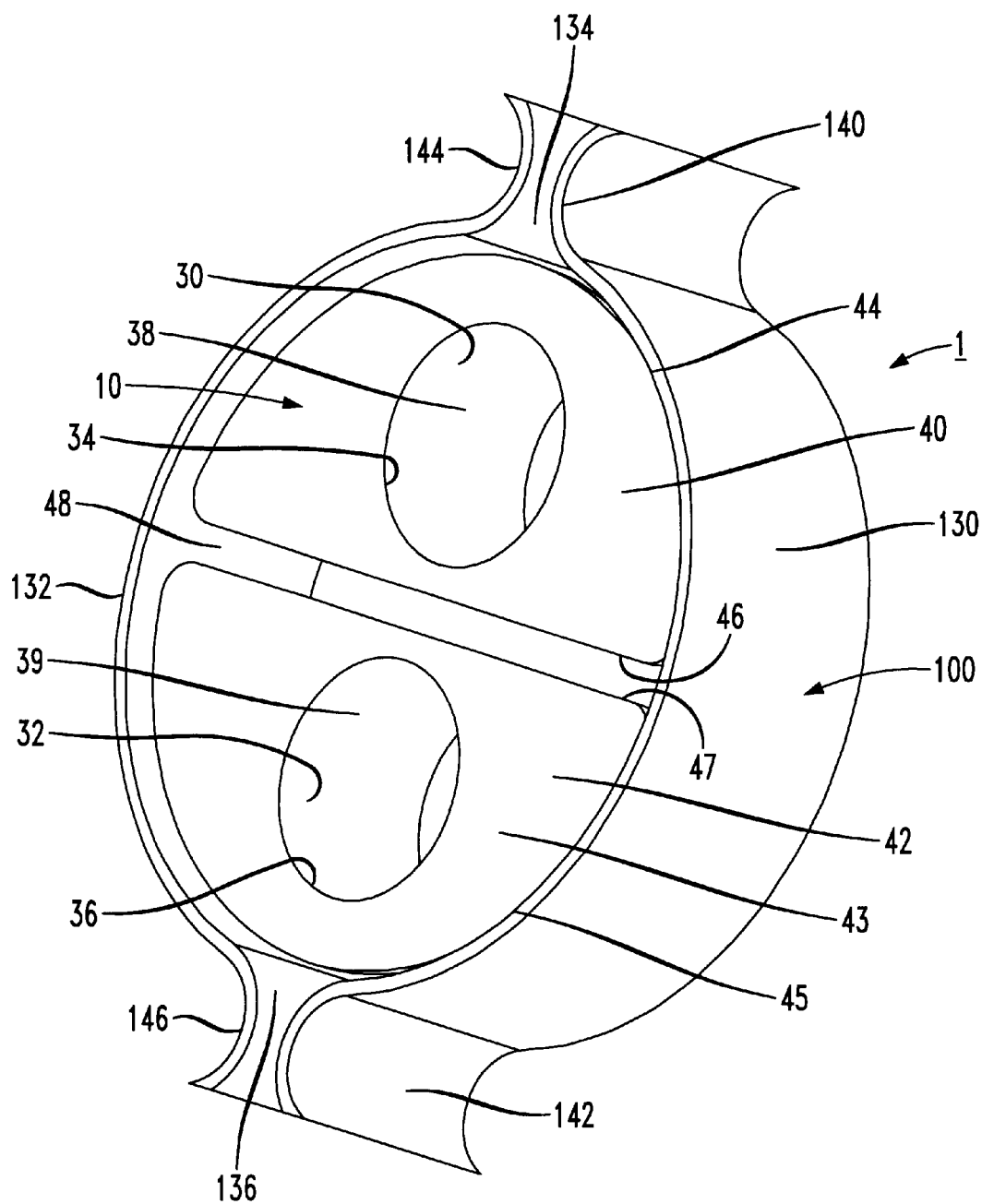
FIG. 2 is a top perspective view of the storage device of the present invention.

With reference to the drawings, wherein the same reference number indicates the same element throughout, there is shown in FIG. 1 a view of the present invention.

The retractable fiber slack storage device 1 of the present invention, as may be seen in FIG. 1 by way of illustrative example, comprises a spool 10 for windably taking up a slack length of fiber optic strand, a housing 100 for enclosing the taken up slack length, a resilient torsion spring 200 for resiliently biasing the spool 10 against rotation with respect to the housing 100 and dispensing the slack length against said bias and a nut 300 for releasably holding the foregoing components together.

Figure 5:
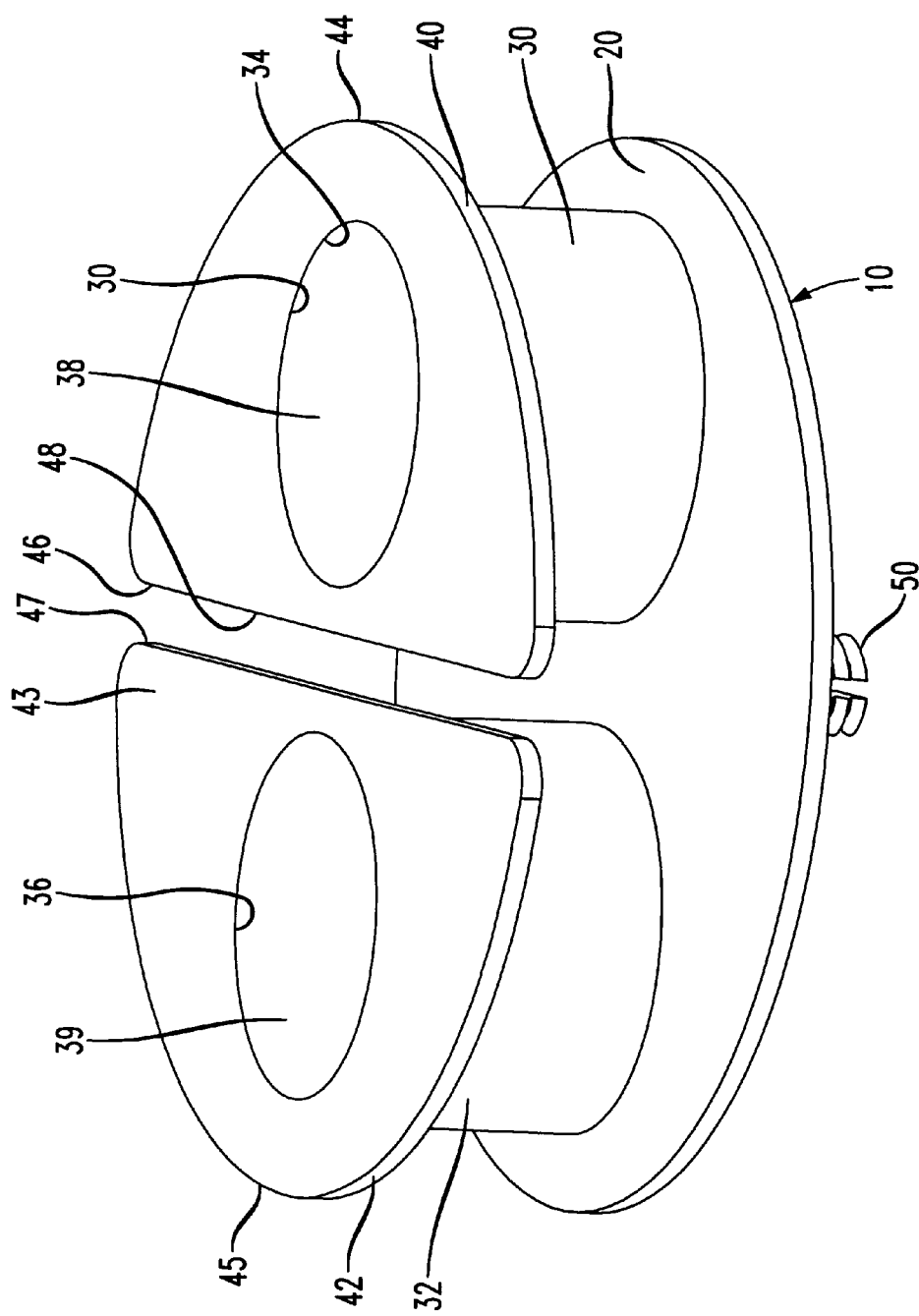
FIG. 5 is an a top perspective view of the spool component of the storage device of the present invention.

As may be seen in FIGS. 2 through 6 by way of illustrative example, the spool 10 comprises a circular disk base plate 20 with a pair of diametrically-opposed, upstanding cylindrical barrels 30 and 32, each of which terminates in a D-shaped cap 40 and 42 (best shown in FIGS. 5 and 6). The housing 100 comprises a circular base 120 with a pair of opposed, upstanding semi-cylindrical side walls 130 and 132 that define a pair of vertical slotted apertures 134 and 136 between them. Each end of each of the sidewalls 130 and 132 terminates in a curved lip 140, 142, 144, and 146, such that a lip, 140 or 142, respectively, from one side wall 130 and the opposed lip, 144 or 146, respectively, from the other side wall 132 define a curved-throat aperture 134 or 136 to the interior of the housing 100. The spool 10 is rotatably mounted to the housing 100 by a depending stub shaft 50 on the spool 10 and a nut 300. The spool 10 is resiliently biased against counter-rotation by a torsion spring 200 operatively connected between the spool 10 and the housing 100.

With respect to the spool 10, the base plate 20 is configured as a circular disk. The longitudinal central axis, and the axis of rotation, of the stub shaft 50 passes through the center of the circular disk 10 so that the disk 10 is circularly rotatable with respect to the housing 100. The proximal portion 52 of the stub shaft 50 that is adjacent or proximal to the disk 10 is cylindrical, or smooth, so that it rotates smoothly with respect to the housing 100. The distal portion 54, or tip, of the stub shaft 50 is threaded so that a nut 300 can be threaded onto it to attach the spool 10 to the housing 100. The stub shaft 50 is also provided with a transverse diametric slot 56 for holding one end of the torsion spring 200 fixed with respect to the spool 10. Preferably, the slot 56 extends into the cylindrical portion 52 of the stub shaft 50. Also, the stub shaft 50 is preferably formed integrally with the disk 20.

The cylindrical barrels 30 and 32 of the spool 10 are disposed diametrically with respect to each other and have their longitudinal central axes equidistant from the axis of rotation of the spool 10 for smooth dispensing and retraction of slack. The minimum radius of curvature of a barrel 30 or 32 is equal to or greater than the minimum bend radius of the fiber optic strand that is stored on the spool 10. This is desirable since bending a fiber optic strand to less than its minimum bend radius damages it or impairs the transmission characteristics of the strand. Desirably, the minimum bend radius of the fiber optic strand may be about 0.5 inches although 1.5 inches is more typical. Preferably, the top end 34 and 36 of each barrel 30 and 32 is provided with an aperture 38 and 39 and open to permit the user to turn the spool 10 by inserting a finger into the aperture 38 or 39 and turning the spool 10. The top end 34 and 36 of each barrel 30 and 32 is terminated by a D-shaped cap 40 and 42. Together, the caps 40 and 42 define a slotted cover 43 for the device 1. The arcuate outer edge 44 and 45 of each cap 40 and 42 is semicircular and the cover 43 is generally circular with a diameter, preferably, generally equal to the diameter of the disk 20. The inner edge 46 and 47 of each cap 40 and 42 is straight and disposed in parallel relation to the other so that they define an open-ended slot 48 in the cover 43. The slot 48 allows the slack length of fiber optic strand to be placed onto the spool 10 and to be held during rotation of the spool 10. The width of the slot 48 should be only slightly wider than the diameter of the fiber optic strand being stored in order to facilitate retention of the slack length on the spool 10. Further, the inner edges 46 and 47 of the caps should overlie the barrels such that an undercut lip is provided on each side of the slot to facilitate such retention. The longitudinal central axis of the slot 48 is parallel to the general plane of the disk 20 and passes though and is perpendicular to the axis of rotation of the disk 20. As may be seen in FIGS. 3 and 4, the outer edges 44 and 45 and the outer peripheral edge of the disk 20 extend radially outwardly of the outer periphery of each barrel 30 and 32 to provide takeup space on the spool 10 for the slack length of fiber optic strand.

Figure 8:
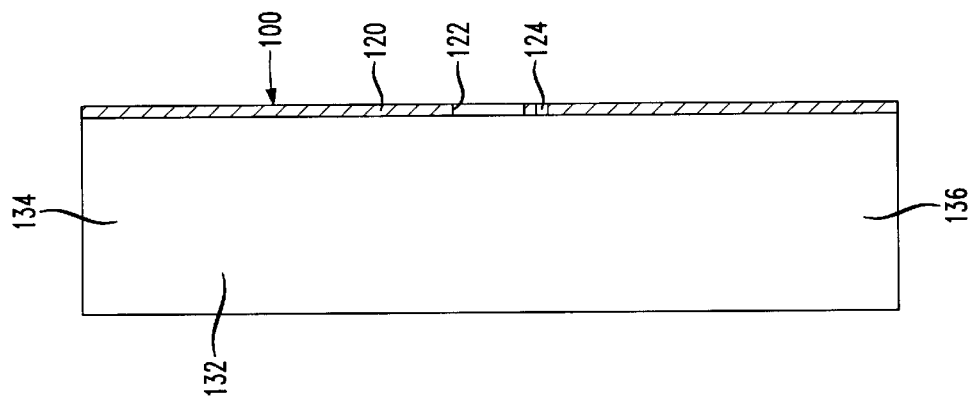
FIG. 8 is a side elevation view, taken in section along line 8—8 of FIG. 7, of the housing component of the storage device of the present invention.
Figure 7:
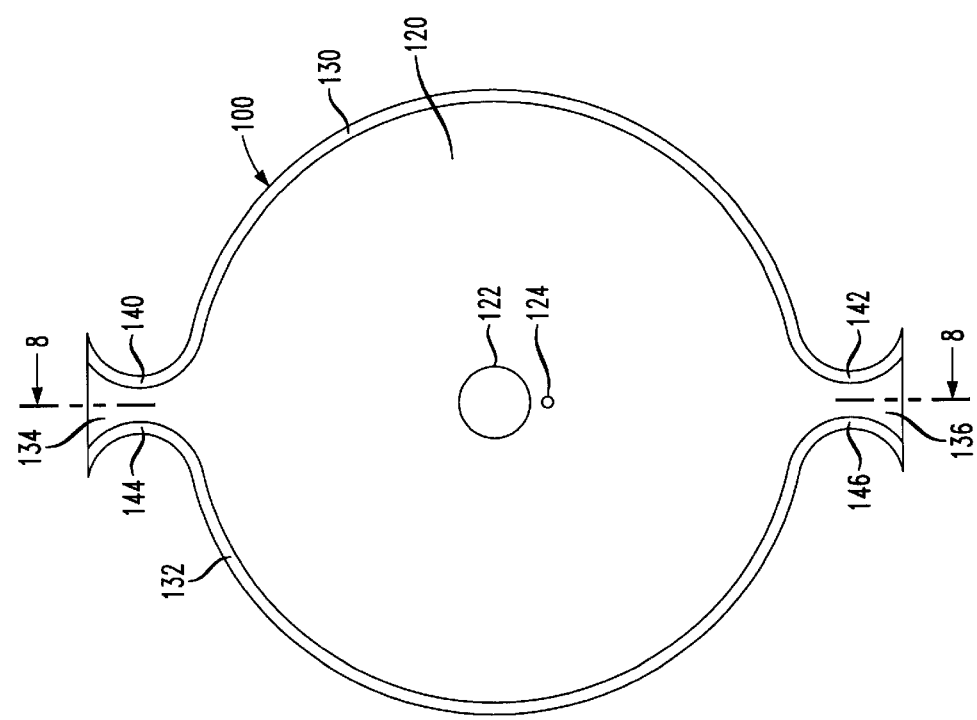
FIG. 7 is a top plan view of the housing component of the storage device of the present invention.

As may be seen in FIGS. 7 and 8 by way of illustrative example, the circular base 120 of the housing 100 has a diameter that is greater than the diameters of the disk 20 and the cover 43 of the spool 10 in order to provide rotational clearance between the spool 10 and the housing 100. The base is provided with a centrally disposed circular aperture 122 (FIGS. 7 and 8) through which the stub shaft 50 passes. The center of the aperture 122 is coincident with the center of circular disk 20. As shown in FIG. 4, radially offset and spaced from the aperture 122 is a spring aperture 124 passing through the base 120 for retaining one end of the torsion spring 200. The aperture 124 holds one end of the torsion spring 200 fixed with respect to the housing 100.

The semicylindrical side walls 130 and 132 extend perpendicularly upward from the base 120 and extend circumferentially around the base 120, terminating in opposed lips 140, 142, 144 and 144 that define a pair of vertical slot-shaped apertures 134 and 136. These apertures 134 and 136 are disposed in diametric opposition to each other. They are curve-throated to facilitate movement of the slack length through the apertures 134 and 136. The minimum radius of curvature of each curved lip is preferably equal to or greater than the minimum bend radius of the fiber optic strand stored in the device 1. This is desirable since bending a fiber optic strand to less than its minimum bend radius damages it or impairs the transmission characteristics of the strand. The longitudinal central axis of each slot-shaped aperture 134 or 136 is perpendicularly disposed with respect to the general plane of the base 120.

Figure 10:
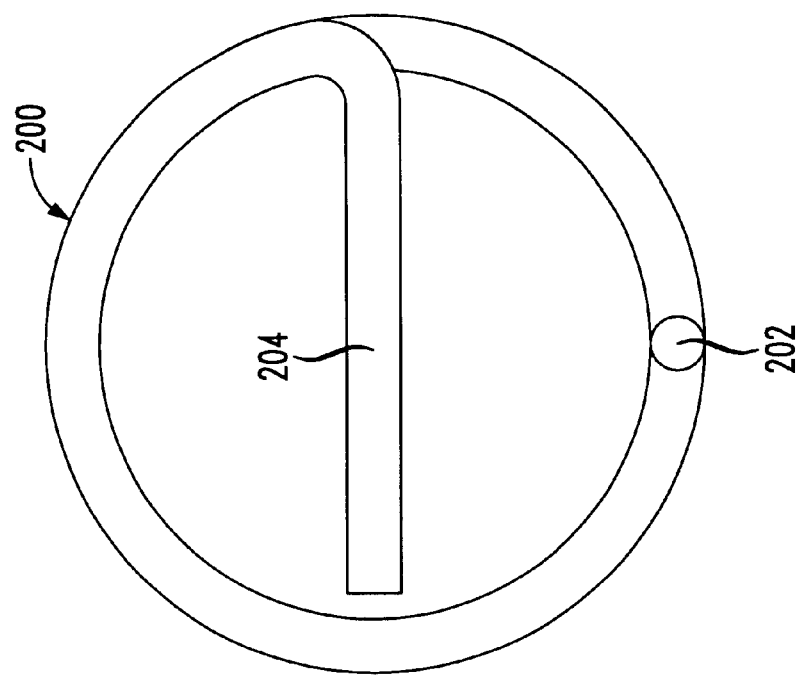
FIG. 10 is a bottom plan view of the spring component of the storage device of the present invention.
Figure 9:
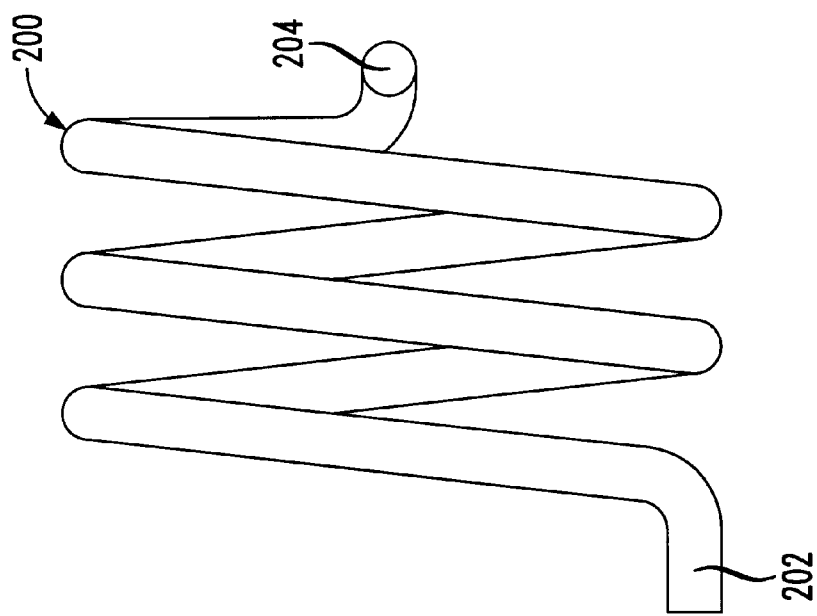
FIG. 9 is a side elevation view of the spring component of the storage device of the present invention.

As may be seen in FIGS. 9 and 10 by way of illustrative example, the torsion spring 200 has a cylindrical helix configuration with the proximal end 202 (with respect to being mounted to the housing 100) being turned up to be generally parallel to the longitudinal central axes of both the spring 200 and the stub shaft 50. This end 202 is inserted into the spring aperture 124 on housing 100 (best shown in FIG. 4). The distal end 204 of the torsion spring 200 is bent radially inward so as to extend diametrically across the cylindrical helix and perpendicular to the longitudinal central axis of the spring 200. The longitudinal central axis of the distal end 204 extends through the longitudinal central axis of the torsion spring 204. This end 204 is inserted into the slot 56 on stub shaft 50 (best shown in FIG. 4). When installed, the torsion spring 200 is held in place on stub shaft 50 by threading nut 300 onto the threaded portion 54 of the stub shaft 50.

Figure 11:
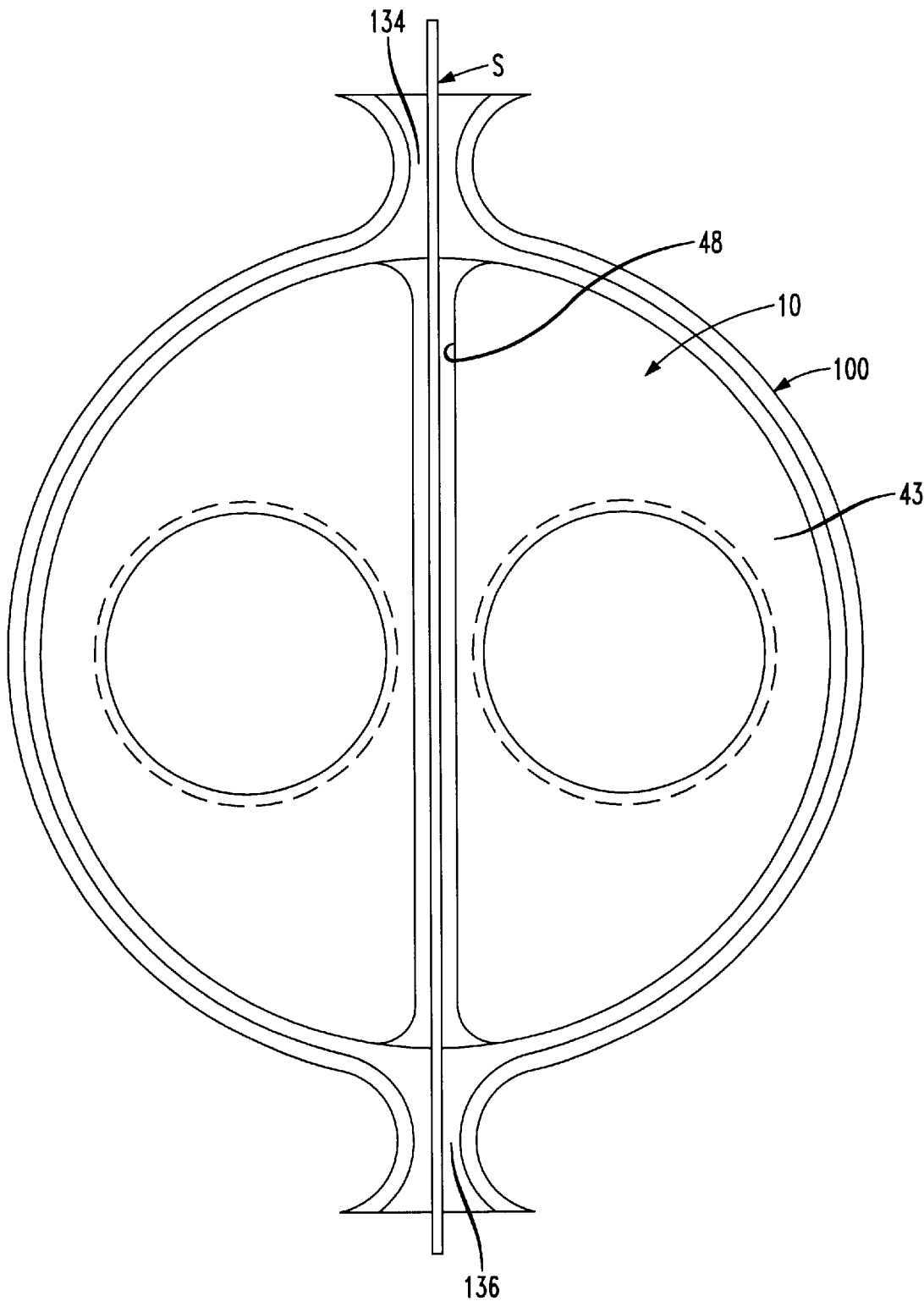
FIG. 11 is a top plan view of the storage device of the present invention showing the initial placement of a slack length of fiber in the device.

As may be seen in FIG. 11 by way of illustrative example, in using the device 1 of the present invention, the spool 10 is installed in the housing 100 with the stub shaft 50 extending through the aperture 122 on the housing 100 (best shown in FIG. 4) and the longitudinal central axis of the slot 48 is aligned with the slot-shaped apertures 134 and 136. Then, the general midpoint of a slack length of fiber optic strand S is placed into the slot 48 beneath the level of the cover 43.

Figure 12:
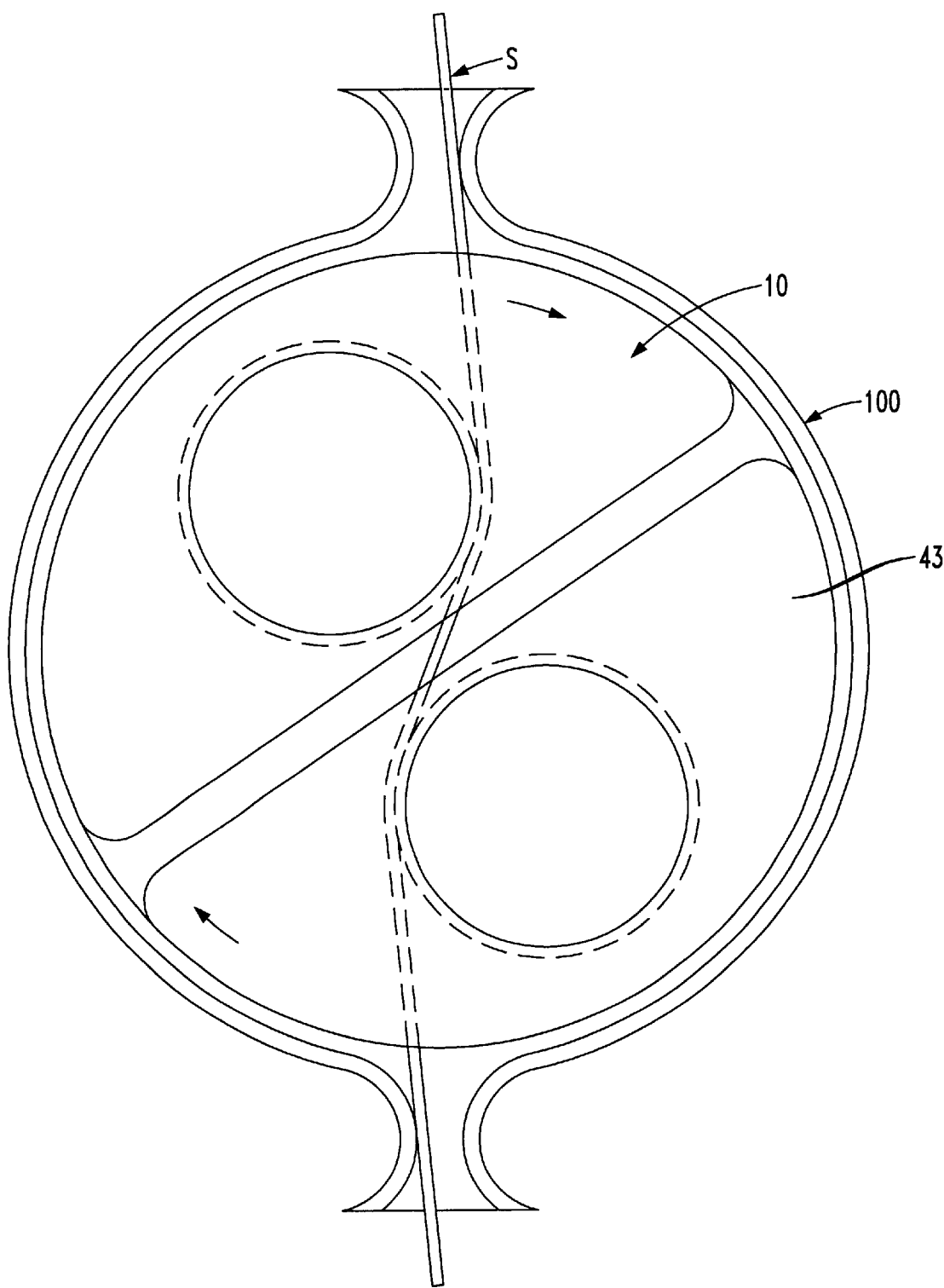
FIG. 12 is a top plan view of the storage device of the present invention showing the further placement of a slack length of fiber in the device.

Then, and as may be seen in FIG. 12 by way of illustrative example, the spool 10 is rotated with respect to the housing 100. In doing so the slack length S passes under the cover 43 and starts to wrap around the confronting surfaces of each of the two barrels 30 and 32.

Figure 13:
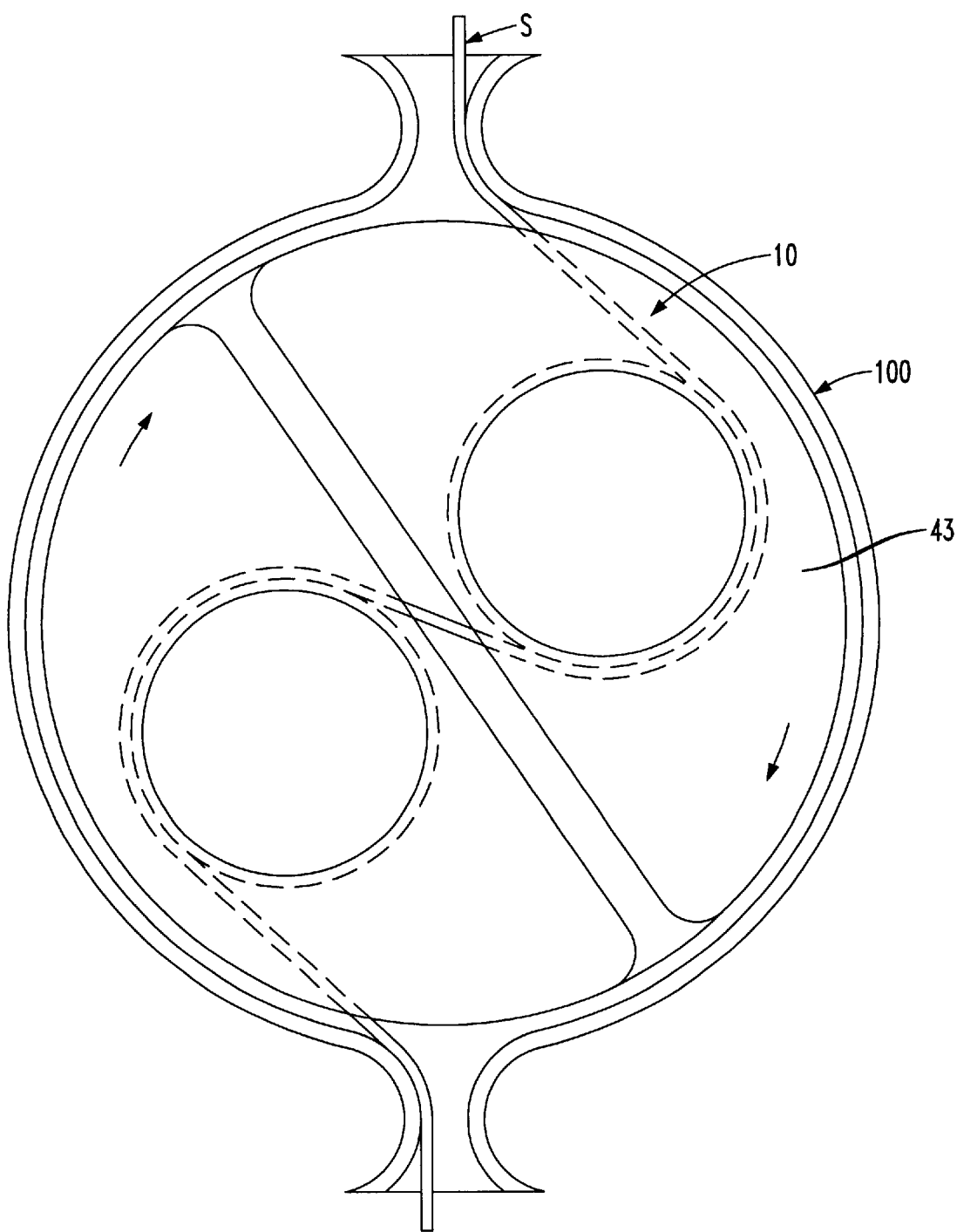
FIG. 13 is a top plan view of the storage device of the present invention showing the further placement of a slack length of fiber in the device.

As the rotation of spool 10 continues, and as may be seen in FIG. 13 by way of illustrative example, the slack length continues to wrap itself around the confronting surfaces of each of the two barrels 30 and 32.

Figure 14:
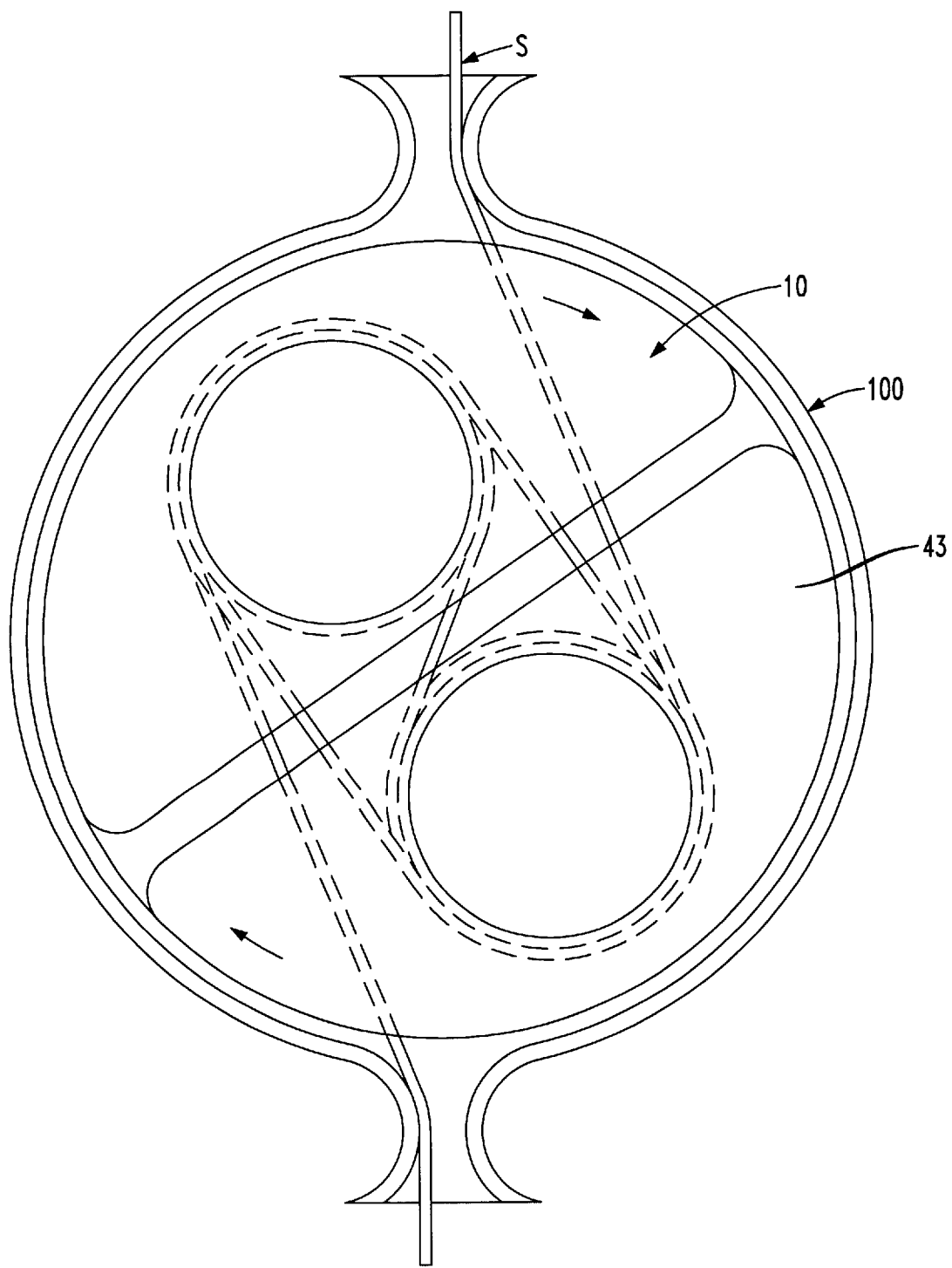
FIG. 14 is a top plan view of the storage device of the present invention showing the further placement of a slack length of fiber in the device.

This wrapping rotation continues, as may be seen in FIG. 14 by way of illustrative example, until the desired amount of slack length has been stored in the device 1. At this point the torsion spring 200 is slipped over the stub shaft 50 with its proximal end 202 extending toward the housing 100 and the proximal end 202 is inserted into the spring aperture 124 on housing 100 and the distal end 204 is inserted into slot 56 on the stub shaft 50. Then, the nut 300 is threaded onto the stub shaft 50 and tightened to hold the spool 10, the housing 100 and the torsion spring 200 in place (best shown in FIG. 4). The torsional resilience of the torsion spring 200 biases the spool 10 and its wound slack length S against rotation, bearing in mind that the weight of the device 1 and its slack length S will cause some small amount of rotation until an equilibrium is established. The device 1 of the present invention, when suitably configured, may provide storage for from about 25 to about 100 feet of slack length of fiber optic strand.

In dispensing a portion of the slack length from the device 1, it is hung from the unstored portion of the fiber optic strand that hangs from a frame, a rack or other overhead anchor. When the free end of the slack length that exits the device 1, or the device itself, is pulled, the stored slack length will dispense generally equal amounts of slack length from both ends of the device 134 and 136, dispensing the amount of slack length that is desired, as may be seen in the reverse sequence of FIGS. 14, 13, 12 and 11. The slack length remains taut without any unnecessary amount of unstored slack length hanging or festooning. Thereafter, when a reconnection requires less length, the device 1 automatically retracts the slack.

It is apparent that many modifications and variations of the invention may be made without departing from the spirit and scope of the present invention. It is understood that the invention is not confined to the particular construction and arrangement herein described, but embraces such modified forms of it as come within the appended claims. The specific embodiments described are given by way of example only and the invention is limited only by the terms of the appended claims.

What I claim is:

1. A device for storing a slack length of a fiber optic strand comprising:
    a. spool comprising a pair of diametrically-opposed cylindrical barrels,
    b. a cylindrical housing for at least partially enclosing said spool,
    c. a torsion spring of a generally cylindrical helix configuration, a first end of said spring being configured to be operatively affixed to said spool and a second end of said spring being configured to be operatively affixed to said housing; and
    d. said spool being disposed in said housing and rotatable with respect thereto and the minimum radius of curvature of each of said cylindrical barrels being equal to or greater than the minimum bend radius of said fiber optic strand.

2. The device according to claim 1, wherein said spool comprises a stub shaft, the longitudinal central axes of said shaft and said spool being coincident.

3. The device according to claim 2, wherein said stub shaft is provided with a diametric transverse slot for fixing said first end of said spring.

4. The device according to claim 1, wherein said housing is provided with a spring aperture for fixing said second end of said spring.

5. The device according to claim 2, wherein
    a. said stub shaft is provided with a diametric transverse slot for fixing said first end of said spring and
    b. said housing is provided with a spring aperture for fixing said second end of said spring.

6. The device according to claim 2, wherein
    a. said stub shaft is provided with a threaded portion and
    b. said device comprises an internally threaded nut for releasably assembling said spool with said housing.

7. The device according to claim 1, wherein
    a. the longitudinal central axis of said first end extends perpendicular to the longitudinal central axis of said cylindrical configuration and
    b. the longitudinal central axis of said second end extends parallel to the longitudinal central axis of said cylindrical configuration.

8. A device for storing a slack length of a fiber optic strand comprising:
    a. a spool comprising a pair of diametrically-opposed cylindrical barrels,
    b. a cylindrical housing for at least partially enclosing said spool, said housing comprises a pair of diametrically-opposed semicylindrical side walls, and
    c. said spool being disposed in said housing and rotatable with respect thereto and the minimum radius of curvature of each of said cylindrical barrels being equal to or greater than the minimum bend radius of said fiber optic strand.

9. The device according to claim 8, wherein
    a. said spool is rotatable and
    b. said barrels are disposed equidistant from the axis of rotation of the spool.

10. The device according to claim 8, wherein
    a. said spool comprises a circular disk and
    b. each barrel is attached to said disk and extends perpendicularly upward from said disk.

11. The device according to claim 8, wherein
    a. said side walls laterally terminate in vertical side edges and
    b. said side edges of adjacent side walls providing slot-shaped vertical apertures.

12. The device according to claim 11, wherein said apertures are provided with arcuate throats.

13. the device according to claim 12, wherein the minimum radius of curvature of said throats is equal to or greater than the minimum bend radius of said fiber optic strand.

14. The device according to claim 8, wherein
    a. said spool comprises a circular disk and
    b. said housing comprises a circular base, the diameter of said circular base being greater than said circular disk.

15. The device according to claim 2, wherein each of said barrels is provided with an open top end.

16. A device for storing a slack length of a fiber optic strand comprising:
    a. a spool comprising a pair of diametrically-opposed cylindrical barrels, each of said barrels is provided with a top end and each top end is terminated by a D-shaped cap;
    b. a cylindrical housing for at least partially enclosing said spool, and
    c. said spool being disposed in said housing and rotatable with respect thereto and the minimum radius of curvature of each of said cylindrical barrels being equal to or greater than the minimum bend radius of said fiber optic strand.

17. The device according to claim 16, wherein said D-shaped caps are oriented and configured to provide a slotted cover for said spool.

18. A device for storing a slack length of a fiber optic strand comprising
    a. a spool comprising a pair of diametrically-opposed cylindrical barrels, the minimum radius of curvature of each of said cylindrical barrels being equal to or greater than the minimum bend radius of said fiber optic strand,
    b. a cylindrical housing for at least partially enclosing said spool; and comprising a pair of diametrically-opposed semicylindrical side walls, said side walls laterally terminating in vertical side edges, the side edges of adjacent side walls providing slot-shaped vertical apertures, said apertures being provided with arcuate throats, the minimum radius of curvature of said throats being equal to or greater than the minimum bend radius of said fiber optic strand, and
    c. a torsion spring of a generally cylindrical helix configuration,
        i. a first end of said spring being configured to be operatively affixed to said spool and
        ii. a second end of said spring being configured to be operatively affixed to said housing,
    d. said spool being disposed in said housing and rotatable with respect thereto.

* * * * *